United States Patent [19]
Hartrumpf

[11] Patent Number: 6,097,491
[45] Date of Patent: Aug. 1, 2000

[54] DEVICE FOR MEASURING THE CO-ORDINATES OF ONE OR SEVERAL RETROREFLECTORS APPLIED ON AN OBJECT

[75] Inventor: Matthias Hartrumpf, Karlsruhe, Germany

[73] Assignee: Fraunhofer-Gesellschaft zur Forderung der Angewandten Forschung E.V., Munich, Germany

[21] Appl. No.: 09/155,980

[22] PCT Filed: Apr. 10, 1997

[86] PCT No.: PCT/EP97/01783

§ 371 Date: Feb. 9, 1999

§ 102(e) Date: Feb. 9, 1999

[87] PCT Pub. No.: WO97/38327

PCT Pub. Date: Oct. 16, 1997

[30] Foreign Application Priority Data

Apr. 10, 1996 [DE] Germany ............ 196 14 108

[51] Int. Cl.[7] ............... G01B 11/14; G01V 8/00
[52] U.S. Cl. ...................... 356/375; 250/559.38
[58] Field of Search .......... 250/559.38; 356/378

[56] References Cited

U.S. PATENT DOCUMENTS 4,123,165 10/1978 Brown et al. .
4,171,910 10/1979 Derderian et al. ............ 356/371
4,736,247 4/1988 Graham et al. .
4,763,361 8/1988 Honeycutt et al. .

FOREIGN PATENT DOCUMENTS 2285550 7/1995 United Kingdom .
9109325 6/1991 WIPO .

*Primary Examiner*—Frank G. Font
*Assistant Examiner*—Zandra V. Smith
*Attorney, Agent, or Firm*—Birch, Stewart, Kolasch & Birch, LLP

[57] ABSTRACT

A device is disclosed for measuring the co-ordinates of at least one retroreflector applied on an object. The light emitted by a lighting unit reaches the at least one retroreflector through a beam splitter, the light reflected from the retroreflector towards the beam splitter is separated from the path of the lighting beam, and said light falls on a detector unit by means of which the position of incidence of the detected light spot can be determined. The light from the lighting unit forms a beam which lights on the surface of the object a larger surface area than the surface area of the at least one retroreflector applied thereon. The detector unit is located in a place where the position and/or shape of the detected light spot change with the position of the retroreflector.

12 Claims, 4 Drawing Sheets

DEVICE FOR MEASURING THE CO-ORDINATES OF ONE OR SEVERAL RETROREFLECTORS APPLIED ON AN OBJECT

This application is the national phase under 35 U.S.C. §371 of prior PCT International Application No. PCT/EP97/01783 which has an International filing date of Apr. 10, 1997 which designated the United States of America, the entire contents of which are hereby incorporated by reference.

BACKGROUND OF THE INVENTION

1. Field of the Invention

The present invention relates to a device for measuring the co-ordinates of one or several retroflectors applied on an object, in which light from an illumination unit reaches at least one retroreflector via a beam splitter, light reflected back by the retroreflector is separated from the illumination beam path at the beam splitter and the light impinges upon a detector unit with which the impinging of the detected light spot can be determined.

2. State of the Art

A number of processes have been developed for determining optical co-ordinates based on optical marking of the object and determining the position of the optical marking from one or multiple reference points.

Depending on the type of marking these processes can be divided into 2 classes:

A. Processes in which the marking occurs only optically (see A-document DE 4325542). The to-be-measured object does not need to be especially treated. A light beam having a known beam course illuminates the object and is scattered on the surface of the object. The scattering surface of the object represents the marking and is imaged on a position-resolving or image-giving sensor. These processes are distinguished by the necessity of imaging the illuminated surface of the to-be-measured object on the sensor. Measuring is usually not possible in the case of reflecting objects, because radiation falls on the detector only if the detector, the illumination and the surface of the object are in a particular angle position in relation to each other. Retroreflecting objects can principally not be measured, because the illuminating beam path is reflected back within itself.

B. Processes for measuring optically particular points. In these processes, a special marking is applied on or in the to-be-measured object if the object itself does not possess the special optical property.

Common markings are:

1. Luminous markings (see SELCOM company publication: "Precision non-contact measurement is simpler than you think").
2. Markings that effectively scatter in the used spectral range (relative to the surroundings).
3. Retroreflectors (see European patent EP 0405423B1), KERN company publication SMART310).

Measuring according to A and measuring according to the markings 1 and 2 occurs via an image of the luminous respectively illuminated surface of the object or the marking on position-resolving respectively image-giving sensors. For these processes, an imaging optic has to be utilized between the marking and the object. Due to this, the following problems can arise:

Problems due to the restricted focal depth range respectively the necessity of focusing Falsification of the measurement due to imaging errors, poor contrast respectively reflecting surfaces in the measuring field.

In measuring systems according to B.1., a luminous element has to be attached to each interesting point of the object. The element has to illuminate the surrounding space in such a manner that sufficient light falls on the sensor so that the image of the element can be distinctly differentiated from the surroundings in the sensor plane. To do so, the element has to be supplied with energy. This means that either an energy carrier has to be applied, and the size of the element becomes relatively large, or supply cables have to be laid to the object. The costs of applying them to a to-be-measured object are relatively big.

In the processes based on imaging a scattering marking, the contrast between the image of the surrounding and the image of the marking has to be obtained by suitably intensive respectively selective illumination of the measured area. With this type of measuring, in circumstances, considerable measuring errors can occur if there are reflecting or shiny surfaces in the measuring field. Furthermore, strong illumination of the measuring area is often only obtainable with relatively great energy expenditure.

On the other hand, very efficient are processes based on locating a retroreflector, because it practically reflects the entire light impinging on it within itself respectively offset in parallel. Contrary to the above-mentioned processes, they are not based on imaging the surface of the object respectively the surface of the marking, but rather on locating the retroreflector center with a laser beam. The laser beam is aimed at the retroreflector from the measuring position. These processes are distinguished by the position of the reflector being determined from the angle position of the laser. The optical sensors used in these processes are employed solely to minimize or compensate locating errors: if the laser beam hits the center of the retroreflector, the beam is reflected back within itself, otherwise the beam is reflected back offset in parallel. This offsetting in parallel of the beam is measured at the retroreflector with the optical sensors and the locating error is determined therefrom. Absolutely necessary therefor is that the area of the laser beam on the measuring position is smaller than the active area of the retroreflector. Otherwise, the same light spot position in the sensor plane would always be measured and the effect of the retroreflector would only be that this light spot is turned in relation to the incident spot (about the axis of the spot).

These processes are distinguished by the cross section of the laser beam being smaller (usually <10%) than the cross section of the retroreflector. Another distinguishing feature of this measuring process is that determination of the coordinates is by measuring the locating angles, which have to be corresponding precision and have to be determined. The measuring system usually contains a high-precision, and correspondingly expensive respectively high maintenance, mechanics. Another problem is, in some circumstances, aiming the laser beam at the retroreflector, which has to be carried out at least at the start of a measuring series, usually manually. In a large measuring field, this beam "catching" is, in some circumstances, critical and takes considerable time.

SUMMARY OF THE INVENTION

The present invention is based on the light which is emitted from an illumination unit and falls on a retroreflecting marking, being reflected back and being partly directed at a detector with the aid of a beam splitter, which is applied in front of the illumination unit.

An element of the present invention is that if, contrary to the state of the art systems, the area of the marking is smaller than the illuminated measuring field and, furthermore, if the detector is disposed outside point P', which corresponds to the pupil of the illumination, determination of the position of the markings in the coordinate system of the illumination/detector unit becomes possible. In contrast to the state of the art, for this determination, the illumination/detector unit does not have to be aimed exactly at the center of the reflector. Measuring the reflector co-ordinates can occur directly, i.e. without determination of the locating angles, from measuring the co-ordinates of the resulting light spot in the sensor plane. In contrast to the processes with active or scattering markings, this is already possible without using imaging optical elements.

With an invented device, non-contact measuring of one or multiple points of an object can occur in a simple manner. All that is required is only applying a retroreflected marking (for instance a retroreflecting foil) on the points of the object, obviating in this manner the necessity of applying a luminous element having current supply respectively current delivery on the object. Contrary to the processes based on location, in which the retroreflector diameter has to be considerably larger than the maximum laser cross section in the measuring area, the marking can be small and thus light. Measuring the path movement of a small, quick object is possible only in some circumstances by this means.

Contrary to the processes according to the state of the art, the measuring head does not have to be aimed with high-precision at the reflector. The problems involved therewith are not encountered in a device according to the present invention.

As the measurement principle does not require optical imaging elements such as lenses (which can lead to weakening the radiation impinging upon the sensor) and at the retroreflector itself, almost the entire incident light is reflected back, the beam path is very efficient, i.e. even for a sensor with a measuring range of several decimeters to meters (perpendicular) to the optical axis), illumination can already occur by means of a light diode (LED), thereby permitting high-frequency measurement by means of stray light compensation. If a position-sensitive photodiode (PSD) is used as a sensor and a modulated LED is used, measuring frequencies in the MHz range and an extreme stray light suppression can be achieved.

If image-giving sensors are employed or the image is evaluated visually or photographically, several points of the object can be measured or determined simultaneously.

As no imaging by means of optical elements such as lenses or curved mirrors is necessary, the depth of sharpness range is basically unlimited.

In the event of telecentric illumination, the position of the retroreflecting marking can be determined in one (direction, respectively) plane perpendicular to the optical axis from the co-ordinate(s) of the light spot in the sensor direction (in the case of 1-dimensional sensors) respectively in the detector plane (in the case of 2-dimensiosnal detectors). In the case of divergent or convergent illumination, the beam angle to the optical axis respectively two beam angles, perpendicular to each other, to the optical axis can be determined.

Furthermore, if the size of the markings and the characteristic curve of the radiation of the illumination unit are known, the following values can be determined by measuring the intensity of the radiation reflected by the marking onto the sensor:

in the case of telecentric illumination, a value for the tilting of the retroreflecting marking, because tilting of the marking leads to a reduction of the active retroreflecting area in the illuminated measuring field, in the case of diverging or converging illumination, the distance between the illumination/detector unit and the marking can be determined.

In the event of diverging or converging illumination, principally the same values, as shown above, can be measured. The essential difference between these types of illumination is that in the case of diverging illumination the measuring range starts at the front of the beam splitter whereas in the case of a converging beam path there is practically a "dead zone", in which no useful measuring can occur.

Nonetheless, the construction of a convergent beam path may still be useful in the following cases:

1. if the desired measuring range does not start until at a big distance from the illumination/detector unit or
2. if both a near region in front of the illumination/sensor unit and a distance region having better measuring accuracy respectively than in the case of divergent illumination are desired.

Advantageous preferred embodiments of the present invention achieve the following advantages:

1. Improvement of the robustness of the (intensity) measurement by means of:
   Stray light suppression,
   Suppression of measuring errors by means of tilting the marking,
   Suppression of the influence of soiling of the marking.
2. Derivation of further co-ordinates of the object (position of the surface normals respectively axis of the retroreflector in space).
3. Determination of the coordinates of multiple retroreflectors by means of one illumination/detector unit.

Stray light can be effectively suppressed by means of an apertured diaphragm disposed at site P', corresponding to the pupil of the illumination, in the detector beam path. Measuring errors due to foreign light can be prevented respectively further minimized if the illumination is modulated and the sensor signal is filtered. In the case of a CCD sensor (line or matrix), this filtering comprises subtraction of at least two images or scans. If a PSD is employed, this filtering comprises, for example, a high pass, a band pass or lock-in filtering.

If, for example, a plane retroreflector is tilted perpendicular to the incident beam, the active area in the illuminated measuring field changes and therefore the reflected back intensity. In the case of telecentric illumination, this tilting of the reflector can be determined by means of measuring the intensity. In the case of diverging or converging illumination, the intensity depends on the tilting and the distance of the reflector from the measuring head. If, a ball-shaped reflector or a ball-segment-shaped reflector is used, the influence of tilting on the measured intensity is eliminated, because the active area of the retroreflector does not change in the event of tilting. The determination of the distance by measuring the intensity impinging on the sensor cannot be falsified by tilting.

In a further embodiment of the present invention, the influence of soiling and tilting of the retroreflector can be prevented by measuring with two different types of illumination, the source respectively the projection points of which lie at different distances on or from the optical axis. In the event of two light sources having the same radiation characteristic curve and whose projection points lie at a distance dz on the optical axis, the following relationships (proportionality constant c, active area of the retroreflector A and the distance z between the light source 1 and the reflector) are given:

$$I1 = \frac{c \cdot A}{z^2} \quad I2 = \frac{c \cdot A}{(z+dz)^2}$$

Both the distance z and the marking area A can be determined from the intensities I1 and I2:

$$z = \frac{dz}{\sqrt{I1} - \sqrt{I2}} \quad \text{und} \quad A = \frac{I1}{c} \cdot \frac{dz^2}{\left(\sqrt{I1} - \sqrt{I2}\right)^2}$$

In this manner, determination of the distance is possible even without knowing the size of the marking. The effect of tilting or soiling of the reflector on the intensity to be measured is equivalent to decreasing the marking area. Therefore, this method permits carrying out distance measuring, which neither is falsified by tilting or soiling nor which requires knowing the size of the marking. If the size of the marking is known and soiling is ruled out, in addition, the degree of tilting can be derived from the measured intensities.

There are the following possibilities for measuring the different intensities:

1. The different types of illumination occur simultaneously and are detected by a sensor, which emits separate signals (e.g., color line sensor or color matrix sensor) for the different types of radiation.
2. The different types of illumination occur successively and are detected successively by the same sensor.
3. A combination of the two possibilities can, of course, also be employed and be, in some circumstances, particularly advantageous.

The center of mass co-ordinates of the light spot in the sensor plane are a measure of the angle in which the center of the reflector, seen from the projection point, is located. If illumination occurs from different projection points, the different center of mass co-ordinates in the sensor plane are measured respectively. Therefore, the distance can be determined from the difference in the center of mass co-ordinates. This distance determination can occur as an alternative or as a supplement to the distance measurement by means of the intensities.

A further alternative measuring method for determining the distance is simultaneous measuring, of the beam angles using multiple illumination/detector units applied at different reference points. As the light from each illumination unit impinging on the retroreflector is reflected back within itself, there is no mutual influencing (such as, for instance, would occur in measuring with methods according to A). The reflector co-ordinates can therefore be derived from the measured beam angles by means of a triangulation calculation.

With a further embodiment according to the present invention, multiple retroreflecting markings can be measured with a position-resolving but not image-giving sensor (e.g. a PSD). If the markings comprise retroreflectors in front of which, for example, different color filters are applied respectively and if these markings are illuminated with light from corresponding spectral ranges, it can be achieved that practically only one of the markings reflects the light from one type of radiation respectively. Separation is possible by:

successive illumination with the different types of radiation,
use of one or multiple color-sensitive sensors,
division of the detector beam path into multiple beam paths to the detectors, which respond differently to the individual types of beams,
wavelength-selective beam splitting or
division of the detector beam path into multiple differently filtered part beam paths to the individual detectors.

The individual possibilities can be practically randomly combined. Furthermore, instead of a differentiation by means of color respectively wavelengths, differentiation can occur by means of the state of polarization.

The advantage of a corresponding embodiment is the increase in measuring frequency made possible thereby. The alternative to the method according to the present invention is measuring with an image-giving sensor (CCD matrix). The measuring frequency attainable thereby lies in the magnitude of 10 Hz. In contrast to this, measuring a multiplicity of points according to the present invention can already occur using position-resolving sensors (E.g. PSD) with which measuring frequencies in the MHz range can be attained. For instance, two retroreflecting markings can then be attached at the source and at the tip of a robot's hand. Using measuring systems according to the present invention, the path and direction accuracy of even extremely fast robots can then be measured.

If, according to the present invention, one or multiple gradient filters, i.e. filters which lead to a gradation of the retroreflected intensity over one or both directions of the marking area, is disposed on a relatively extended marking (extension larger than about 10 times the resolution of the measuring range by the sensor and smaller than 100% of the minimal illuminated area in the measuring field, tilting of the marking area can already be determined by means of the position-resolving detectors. Utilized as the measuring effect is that, in the case of illumination with the different types of radiation, deviating center of mass co-ordinates in the sensor plane are determined. Tilting can be determined from the difference of these centers of mass and, if need be, the error of distance measuring resulting from the tilting can be compensated.

If, for instance, a color gradient filter passing from red to blue is applied to the marking, the determined average position of the marking with blue light illumination is shifted in relation to that determined with red light illumination. For a marking aligned perpendicular to the optical axis of the sensor, the distance light spot/center of mass in the sensor plane is only dependent on the distance to the measuring head respectively (with telecentric illumination) constant. By tilting the marking about the axis perpendicular to the optical axis and perpendicular to the color gradation, this measured distance is reduced. If the course of the distance (for tilting) in the measuring area is known or if it is measured once for the marking, tilting of the marking can be determined by measuring this distance.

As described above, the measuring principle requires no imaging optical elements such as lenses or mirrors. Use of elements of this type according to the present invention may nonetheless be useful in order to adapt the imaging scale to the measuring task or the sensor size respectively to optimize, vary or improve the sensitivity of the system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE INVENTION

The present invention will become more fully understood from the detailed description given hereinbelow and the accompanying drawings which are given by way of illustration only, and thus are not limitative of the present invention, and wherein:

DESCRIPTION OF THE PREFERRED EMBODIMENTS

Figure 1:
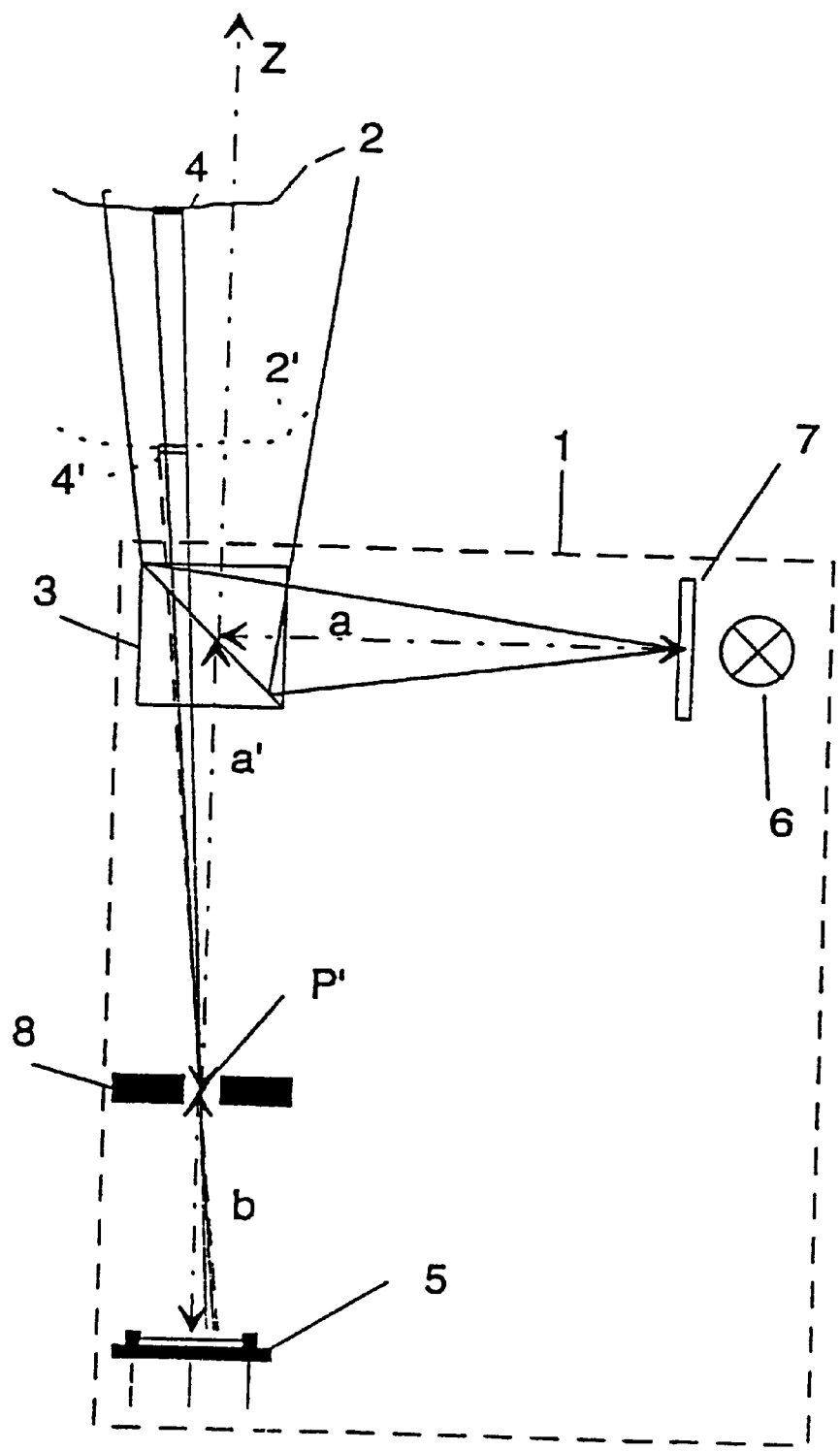

FIG. 1 shows a preferred embodiment of the present invention. It shows a diagrammatic view of an invented measuring head (1), the essential components of which are a light source, a beam splitter (3) and a sensor. In the illustrated example, the light source comprises an incandescent lamp (6) or a light diode and a diffuser (7). Viewed from the outside, it acts like a point light source, which generates a defined cone with homogeneous illumination and is located at a distance a to the center of the beam splitter. Other illumination beam paths such as inhomogeneously illuminated, telecentric or convergent beam paths are also possible and, in some circumstances, advantageous. For measuring all that is needed is knowing the illuminating beam path. The to-be-measured object (2) is located in this beam path. The retroreflecting marking (4) (which must be smaller than the area illuminated at this site) is applied to the to-be-measured object. That part of the illuminating beam path which impinges upon the retroreflecting marking (4) is reflected back within itself. One part of this reflected back radiation reaches via the beam splitter (3) through point P', corresponding to the pupil of the illumination, onto the sensor (5) and yields (already without additional optical elements) a defined light spot on the active area. If the sensor is applied outside point P', the position of the light spot is a measure of the angle at which the retroreflector (viewed from the projection point) is located to the optical axis. In FIG. 1, the same object is drawn, in addition, in the same angle position and at a different distance relative to the sensor (object(2') and retroreflector(4')). As FIG. 1 clearly shows if the distance of the retroreflector to the measuring head changes, both the size of the light spot on the detector and the relationship of the marking area to the illuminated area and therefore the intensity of the radiation impinging upon the detector changes. The intensity of the radiation impinging upon the sensor is a measure of the distance of the reflector from the projection point. Advantageous (but not essential) is the use of a shutter (8) in the detector beam path. If shutter (8) is applied at the site corresponding to the projection point (distance a' on the optical axis Z to the center of the beam splitter), stray light can be effectively shut out.

Figure 2:
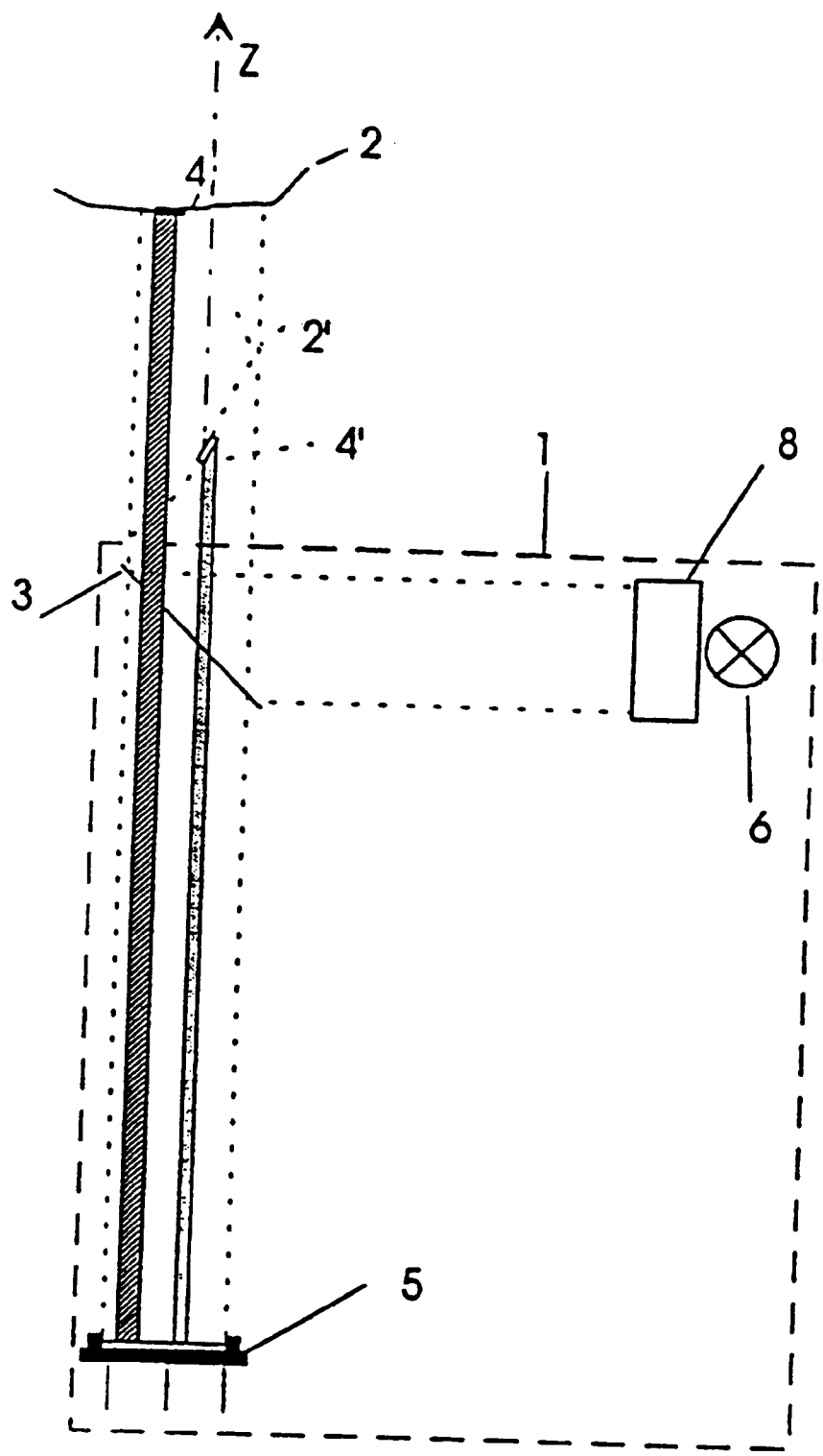

FIG. 2 shows the principle of the invented device having a telecentric beam path. Contrary to the device of FIG. 1, the light from the light source (6) is transformed by optical means (8) (e.g. capacitor, telecentric lens) into a telecentric illumination beam path. The different positions of the measuring objects (2) respectively (2') directly yield the different positions of the light spots on the sensor surface. In addition, FIG. 2 shows that tilting of the marking leads to a reduction of the width of the light spot on the sensor and the quotient from the active marking area to the illuminated area becomes smaller. A measure of the tilting of the marking can therefore be derived from the width of the measuring spot or the intensity proportional to the ratio of the marking area to the illuminated area.

Figure 3:
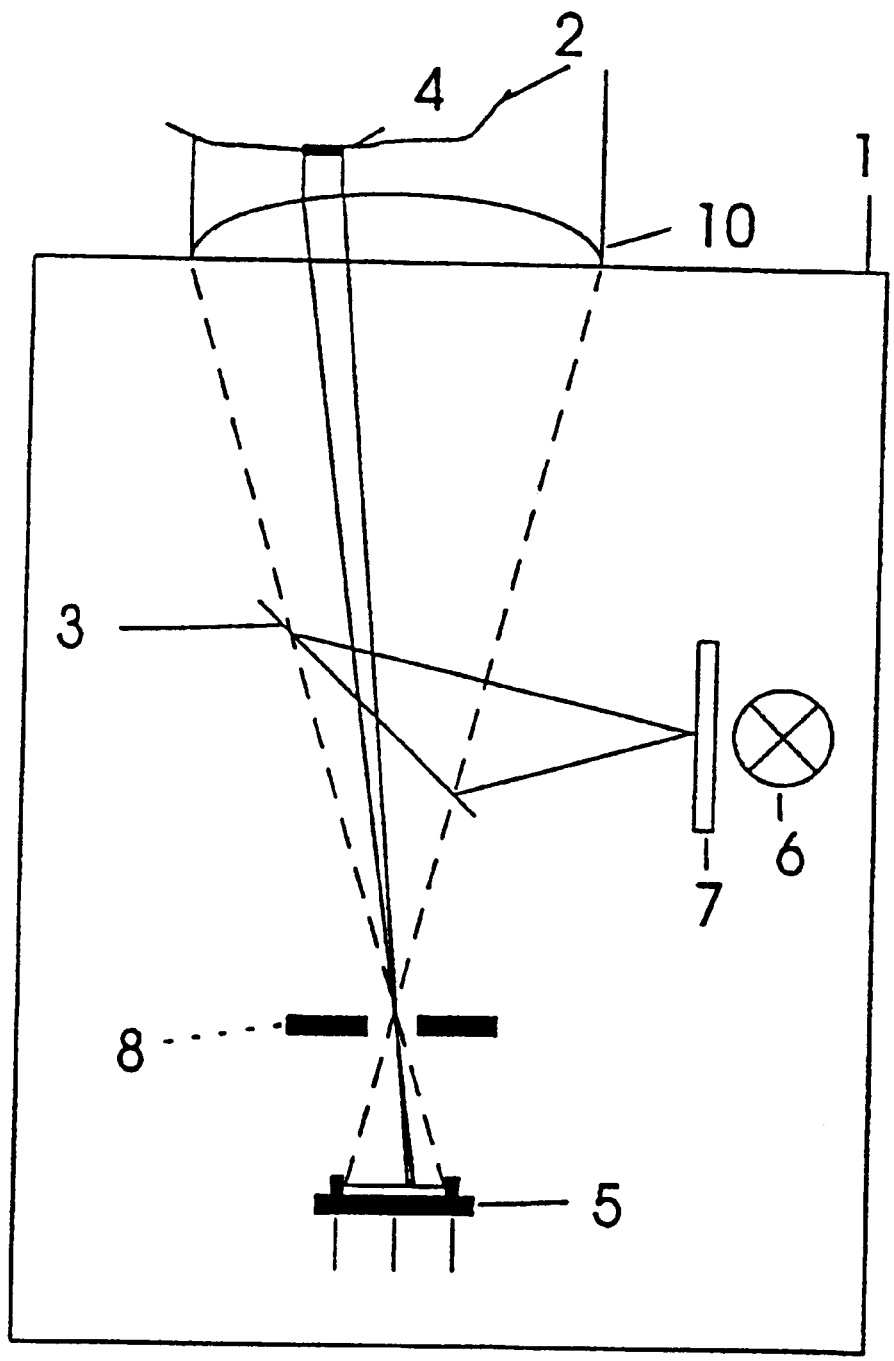

FIG. 3 shows that an advantageous realization of this measuring principle can already occur by means of an imaging optical element (mirror or lens) (10). Except for the optical element (10), the device corresponds to that of FIG. 1. As already mentioned, with it the co-ordinates of the marking and thereby its tilting can be determined.

Figure 4:
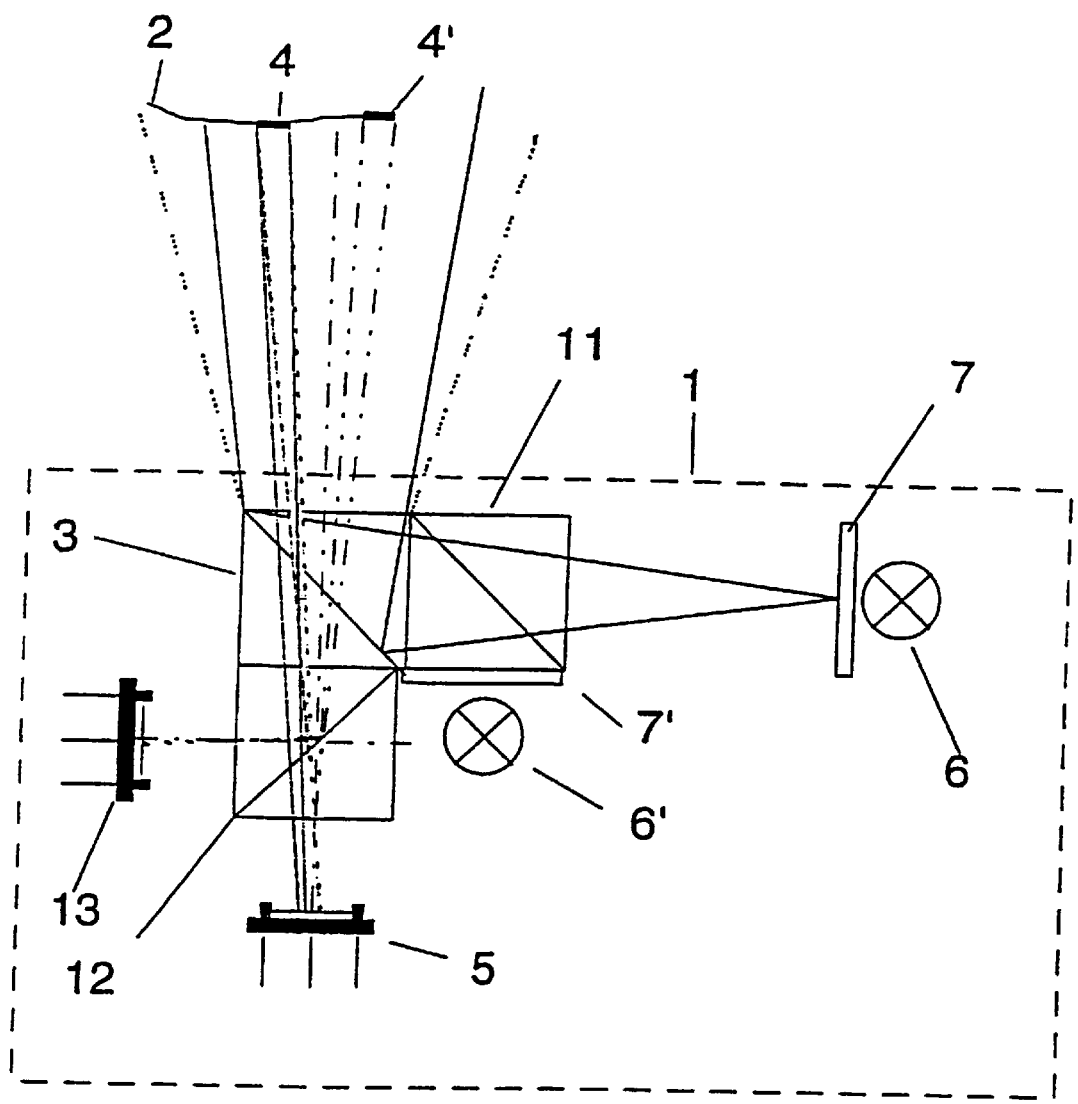

FIG. 4 shows a preferred embodiment of the present invention, in which the illumination beam path is split into part beam paths, which can be modulated temporally differently. In the illustrated example, (6) stands for the light source (for example a multi-color light diode). A diffuser (7) (which for example may comprise a hologram) is located directly behind it(the light source) in the beam path. The radiation emitted therefrom is a homogeneously illuminated light cone 1 (solid lines). The radiation reaches via the beam splitter (11), to which the light from a similar illumination unit (6',7') is coupled in, viewed from the outside, situated on another position on respectively perpendicular to the optical axis and has another aperture angle (broken line). From there the radiation reaches via the beam splitter (3), for reflecting the illumination by means of a mirror into the object space, and finally partially onto the marking 4 located in the measuring field. Another part reaches the marking 4'. Each marking acts like a combination of an (ideal) retroreflector having a different color filter respectively. For instance, marking 4 acts like a retroreflector in the red spectral range and absorbs in the green spectral range. Marking 4' acts exactly reversely. The radiation impinging upon these markings is reflected back into the measuring head. A part of this radiation reaches via the beam splitter (3) the detector (5) (for instance a PSD). If, for example, red light followed by green light is emitted successively with illumination unit (6,7) and then illumination unit (6',7'), very robust (i.e. independent of tilting, soiling and marking size) measuring the 3D co-ordinates of both markings already occurs with just one PDS. The position and alignment of the object in space is determined unequivocally from these two markings. Doubling of the measuring frequency can occur by means of an additional wavelength-selective beam splitter (12) and a second PSD (13), because then the two light diodes can be operated simultaneously (with a different color respectively).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for measuring the coordinates of at least one retroreflector applied to an object, comprising:
    an illumination unit for generating light in the form of a bundle of beams which illuminates an area on a surface of the object larger than an area covered by the at least one retroreflector;
    a beam splitter for receiving the light from the illumination unit and directing the light onto the at least one retroreflector, said beam splitter separating light reflected back from the at least one retroreflector from the light from the illumination unit; and
    a detector unit for receiving the separated light from the beam splitter and retroreflector.

2. The device according to claim 1, further comprising a shutter located at a point corresponding to a pupil of the illumination unit in the beam path of the light reflected back from the at least one retroreflector, said shutter modulating the light from the illumination unit and filtering a signal of the detector unit.

3. The device according to claim 1 or 2, wherein said retroflector is constructed as a ball or a ball segment and/or comprises a retroflecting foil or layer.

4. The device according to claim 1, wherein said detector unit is a ground-glass screen, a film, a photodiode, a position-resolving sensor or an image-resolving sensor.

5. The device according to claim 1 or 2, wherein said illumination unit comprises at least two light sources of varying pupil position, which are temporally alternatingly activatable and/or emit light varying in spectral composition of in a state of polarization.

6. The device according to claim 5, wherein said detector unit is provided with a split sensor for the different light sources.

7. The device according to claim 5, wherein at least two of the at least one retroreflector are provided, said at least two retroreflectors having a wavelength-selective or polarization-dependent reflection behavior.

8. The device according to claim 1, wherein the retroflector area comprises more than about 10% of the illuminated area and one or several filters are applied to said retroflector area to change the reflected back intensity in dependence on the spectral range or on the state of polarization of the illuminating radiation along one or two directions of a surface of the at least one reflector.

9. The device according to claim 1, wherein optical imaging elements are disposed in individual part beam paths.

10. The device according to claim 1, for wherein several of said devices according to claim 1 are directed onto the object area.

11. The device according to claim 4, wherein said detector unit further comprises CCD-lines, a color line, a CCD matrix sensor or a color matrix sensor.

12. The device according to claim 9, wherein said optical imaging elements include lenses, concave mirrors, and parabolic mirrors.

* * * * *